(12) United States Patent
Fukase et al.

(10) Patent No.: US 9,209,475 B2
(45) Date of Patent: Dec. 8, 2015

(54) METHOD FOR MICROBIALLY GENERATING ELECTRICITY AND MICROBIAL POWER GENERATOR

(75) Inventors: Tetsuro Fukase, Tokyo (JP); Nobuhiro Orita, Tokyo (JP); Kazunari Komatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 971 days.

(21) Appl. No.: 12/998,964

(22) PCT Filed: Dec. 9, 2009

(86) PCT No.: PCT/JP2009/070592
§ 371 (c)(1),
(2), (4) Date: Jun. 20, 2011

(87) PCT Pub. No.: WO2010/073907
PCT Pub. Date: Jul. 1, 2010

(65) Prior Publication Data
US 2011/0256427 A1    Oct. 20, 2011

(30) Foreign Application Priority Data

Dec. 24, 2008 (JP) ................................. 2008-327988

(51) Int. Cl.
*H01M 8/16* (2006.01)
*C12F 3/02* (2006.01)

(52) U.S. Cl.
CPC .  *H01M 8/16* (2013.01); *C12F 3/02* (2013.01); *Y02E 60/527* (2013.01)

(58) Field of Classification Search
USPC ....................................................... 429/401
See application file for complete search history.

(56) References Cited

U.S. PATENT DOCUMENTS 3,284,239 A * 11/1966 Hunger et al. ..................... 429/2
5,736,026 A *  4/1998 Patel et al. ..................... 205/343
(Continued)

FOREIGN PATENT DOCUMENTS

CN         1949577 A      4/2007
CN       101242004 A      8/2008
(Continued)

OTHER PUBLICATIONS

Japan Patent Office, "Office Action for JP 2008-327988", Aug. 20, 2013.
(Continued)

*Primary Examiner* — Ula Ruddock
*Assistant Examiner* — Jacob Marks
(74) *Attorney, Agent, or Firm* — Manabu Kanesaka

(57) ABSTRACT

To increase the power generation efficiency of a microbial power generator by using an easy and inexpensive unit. Two plate-like cation-exchange membranes 31 are disposed in parallel in a tank 30. This arrangement allows an anode chamber 32 to be formed between the cation-exchange membranes 31. Two cathode chambers 33 are separated from the anode chamber 32 by using the respective ion-permeable nonconductive membranes 31. An oxygen-containing gas is made to pass through the cathode chamber 33. An anode solution L is supplied to the anode chamber, and, preferably, the anode solution is made to circulate. A biologically treated exhaust gas is used as the oxygen-containing gas to be supplied to the cathode chamber 33. Carbon dioxide in the biologically treated exhaust gas can promote transport of $Na^+$ and $K^+$ ions, and water vapor can increase the ion permeability, thereby increasing the power generation efficiency.

6 Claims, 2 Drawing Sheets

(56) References Cited

U.S. PATENT DOCUMENTS

2005/0026028 A1* 2/2005 Ouchi et al. .................. 429/38
2005/0255345 A1* 11/2005 Gerritse et al. ............... 429/13

FOREIGN PATENT DOCUMENTS

| JP | 20000-133326 | 5/2000 |
|---|---|---|
| JP | 2004-342412 | 12/2004 |
| JP | 2006-331706 | 12/2006 |
| JP | 2007-505442 | 3/2007 |
| JP | 2009-152097 | 7/2009 |
| JP | 2009-231231 | 10/2009 |
| JP | 2010-108778 A | 5/2010 |
| WO | WO 2007/037261 | 4/2007 |

OTHER PUBLICATIONS

Taiwan Patent Office, "Office Action for TW 098144219," Feb. 21, 2014.

* cited by examiner

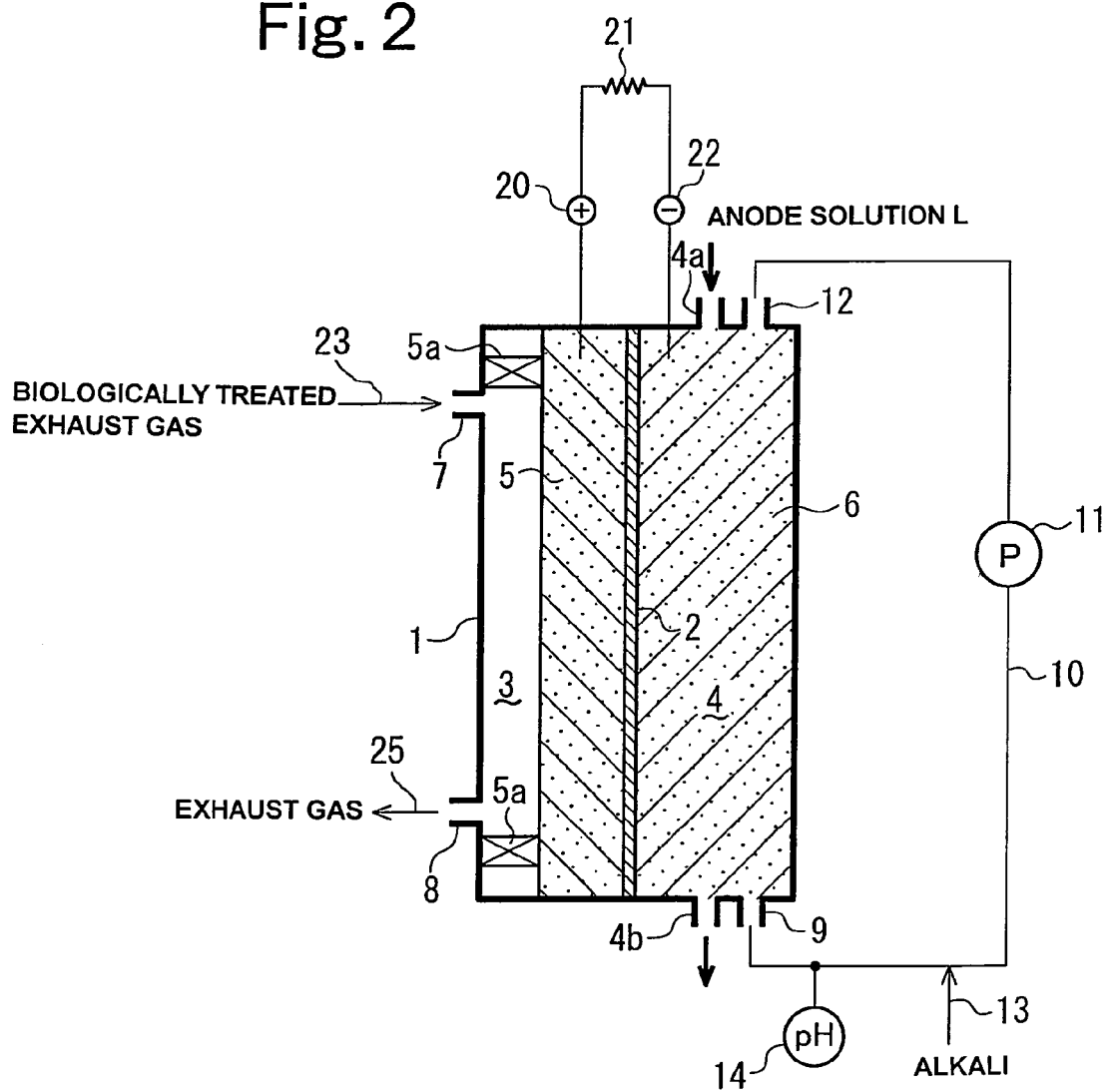

METHOD FOR MICROBIALLY GENERATING ELECTRICITY AND MICROBIAL POWER GENERATOR

FIELD OF INVENTION

The present invention relates to a method for generating electricity and a power generator utilizing a microbial metabolic reaction. In particular, the present invention relates to a method for microbially generating electricity and a power generator which utilizes, as electrical energy, reducing power as obtained during microbial oxidative decomposition of organic matter.

BACKGROUND OF INVENTION

Recently, there has been an increased need for a method for generating electricity, the method taking the global environment into consideration. Technological development in microbial power generation has also been progressing. The term "microbial power generation" refers to a power generation method in which electrical energy is extracted, the electrical energy being obtained when microorganisms utilize organic matter.

Generally, microorganisms, organic matter utilized by the microorganisms, and electron carriers (electron mediator) are made to coexist in an anode chamber where an anode is disposed for microbial power generation. The electron mediator enters the microorganism, receives electrons generated by microbial oxidation of organic matter, and transfers the electrons to the anode. The anode is electrically connected to a cathode via an external resistor (load). The electrons which have been transferred to the anode move to the cathode via the external resistor (load), and then are transferred to an electron acceptor that contacts the cathode. Such electron transfer allows current to flow between the cathode and the anode.

For microbial power generation, since the electron mediator directly extracts electrons from a microorganism, theoretical energy conversion efficiency is high. However, actual energy conversion efficiency is low, and an improvement in power generation efficiency is sought. Therefore, in order to increase the power generation efficiency, various considerations and developments have been made with respect to electrode materials and structures, types of electron mediator, selection of microbial species, and the like (see, for example, Patent Documents 1 and 2).

Patent Document 1 describes that: a cathode chamber and an anode chamber are divided by an alkali-ionic conductor made of a solid electrolyte; the spaces inside of the cathode chamber and the anode chamber are filled with a phosphate buffer (a buffer) having pH 7; and air is blown into the phosphate buffer (a cathode solution) in the cathode chamber to generate power.

Patent Document 2 describes that: a porous body is installed as a cathode plate in such a manner as to cause the porous body to contact an electrolyte membrane which divides a cathode chamber from an anode chamber; air is distributed in the cathode chamber; and the air is made to contact a solution in a space of the porous body. Hereinafter, the cathode which utilizes oxygen in air as an electron acceptor while air is distributed in a cathode chamber in such a manner may be referred to as an "air cathode".

The generator has advantages as follows: a microbial power generator utilizing the air cathode does not require a cathode solution; the generator also only requires to simply distribute air in the cathode chamber; and aeration of the cathode solution is not necessary.

Previously, in order to increase the power generation efficiency of a microbial power generator using the air cathode, the following were considered:
1) mediators for the anode (see, for example, Patent Document 3);
2) pH adjustment of the anode chamber;
3) types of cathode catalyst and methods for supporting the active ingredient of the catalyst; and
4) cathode structures.

PRIOR ART DOCUMENTS

Patent Documents

Patent Document 1: Japanese Patent Publication No. 2000-133326A
Patent Document 2: Japanese Patent Publication No. 2004-342412A
Patent Document 3: Japanese Patent Publication No. 2006-331706A

SUMMARY OF INVENTION

Object of the Invention

Conventional microbial power generators have a low power generation efficiency from 50 to 150 W/m$^3$ per 1 m$^3$ of the anode, therefore a further increase in the power generation efficiency has been desired.

It is an object of the present invention to provide a method for microbially generating electricity and a microbial power generator, which can increase the power generation efficiency of the microbial power generator by simple and inexpensive means.

Means for Attaining the Object

A method of a first embodiment for microbially generating electricity by using a microbial power generator which includes: an anode chamber having an anode and retaining a solution containing a microorganism and an electron donor; and a cathode chamber having a cathode which contacts an ion-permeable nonconductive membrane, the ion-permeable nonconductive membrane separating the cathode chamber from the anode chamber, comprises a step of generating power by feeding an oxygen-containing gas to the cathode chamber, wherein the oxygen-containing gas includes a biologically treated exhaust gas.

A method of a second embodiment for microbially generating electricity is characterized in that, in the first embodiment, an aerobic biologically treated exhaust gas is fed to the cathode chamber as the oxygen-containing gas.

A method of a third embodiment for microbially generating electricity is characterized in that, in the first embodiment, air and an anaerobic biologically treated exhaust gas are fed to the cathode chamber as the oxygen-containing gas.

A method of a fourth embodiment for microbially generating electricity by using a microbial power generator which includes: an anode chamber having an anode and retaining a solution containing a microorganism and an electron donor; and a cathode chamber having a cathode which contacts an ion-permeable nonconductive membrane, the ion-permeable nonconductive membrane separating the cathode chamber from the anode chamber, comprises a step of generating power by feeding an oxygen-containing gas to the cathode chamber, wherein carbon dioxide and water vapor are contained in the oxygen-containing gas to be fed to the cathode chamber.

A method of a fifth embodiment for microbially generating electricity is characterized in that, in the fourth embodiment, air is made to flow through a water tank for aeration so as to contain water vapor for the air, and then the air is fed to the cathode chamber with carbon dioxide.

A microbial power generator of a sixth embodiment comprises: an anode chamber having an anode and retaining a solution containing a microorganism and an electron donor; a cathode chamber having a cathode which contacts an ion-permeable nonconductive membrane, the ion-permeable nonconductive membrane separating the cathode chamber from the anode chamber; and means for feeding an oxygen-containing gas to the cathode chamber, wherein the generator is provided with means for feeding a biologically treated exhaust gas into the cathode chamber.

A microbial power generator of a seventh embodiment is characterized in that, in the sixth embodiment, the generator has means for feeding an aerobic biologically treated exhaust gas into the cathode chamber.

A microbial power generator of a eighth embodiment is characterized in that, in the sixth embodiment, the generator has means for feeding air and an anaerobic biologically treated exhaust gas into the cathode chamber.

A microbial power generator of a ninth embodiment comprises: an anode chamber having an anode and retaining a solution containing a microorganism and an electron donor; a cathode chamber having a cathode which contacts an ion-permeable nonconductive membrane, the ion-permeable nonconductive membrane separating the cathode chamber from the anode chamber; and means for feeding an oxygen-containing gas to the cathode chamber, wherein the generator is provided with means for making carbon dioxide and water vapor be contained in the oxygen-containing gas to be fed to the cathode chamber.

A microbial power generator of a tenth embodiment is characterized in that, in the ninth embodiment, the means for making carbon dioxide and water vapor be contained in the oxygen-containing gas is means for making air flow through a water tank for aeration so as to contain water vapor for the air and then feeding the air with carbon dioxide to the cathode chamber.

Effects of Invention

In the present invention, by using simple and inexpensive means by which a biologically treated exhaust gas is fed into the cathode chamber, the power generation efficiency of the microbial power generator is enhanced.

The inventors have conducted intensive research for increasing the power generation efficiency of the microbial power generator. As a result, the inventors have found that adding an acidic, gas into an oxygen-containing gas to be fed to the cathode chamber promotes transport of $Na^+$ and $K^+$ ions through the ion-permeable nonconductive membrane by a pH neutralizing effect due to the acidic gas, so that the power generation efficiency can be increased. The inventors filed a patent application (Japanese Patent Application No. 2008-280104 (hereinafter, referred to as "the preceding application")) regarding this. Use of carbon dioxide as the acidic gas is preferable because carbon dioxide is inexpensive, very safe, and does not have a problem of corroding equipment.

Further considerations have been made on the basis of the preceding application. As a result, the inventors have found that adding water vapor into the oxygen-containing gas to be fed to the cathode chamber enables the power generation efficiency to be further markedly enhanced.

Details of the action mechanism responsible for the effect of increasing power generation efficiency by this water vapor remain unclear. However, the water vapor is presumed to promote ion permeation of an ion-permeable nonconductive membrane. That is, it is known that an ion-permeable nonconductive membrane such as an ion-exchange membrane varies in its ion permeability according to water content thereof, and that a low water content decreases the ion permeability. When an anion-exchange membrane is used for the ion-permeable nonconductive membrane in particular, dissociation of water at a cathode is required for the ion permeation during biological power generation. A certain amount of water supply to a cathode chamber seems to effectively act not only on the ion permeation but also on production of a hydroxy-ion. Consequently, introducing water vapor into the cathode chamber is effective in dissociation of water on the cathode.

The inventions according to the fourth and fifth embodiments and the ninth and tenth embodiments have been achieved on the basis of such findings.

In such a manner, adding carbon dioxide and water vapor into the oxygen-containing gas to be fed to the cathode chamber can markedly enhance the power generation efficiency. However, sites (e.g., a wastewater treatment plant and a raw garbage treatment plant) which carry out biological power generation usually fail to have sources that supply carbon dioxide. In addition, liquid carbon dioxide, etc., is expensive, and therefore economically disadvantageous. Moreover, humidification for addition of water vapor is troublesome.

In contrast, a biologically treated exhaust gas such as a biologically treated exhaust gas generated by an activated sludge method contains sufficient oxygen, and further contains carbon dioxide generated during wastewater treatment. So, the concentration of carbon dioxide is high. Moreover, the exhaust gas has high humidity and includes a sufficient amount of water vapor.

In particular, when an aeration tank having activated sludge is operated at neutral to weakly acidic pH, the exhaust gas has a higher concentration of carbon dioxide, and is suitable as a gas to be fed to the cathode chamber.

In addition, use of an air diffuser having high oxygen-dissolution efficiency such as a microscopic-bubble-diffuser tube which has been recently widely used for the purpose of energy saving enables the concentration of carbon dioxide in the exhaust gas to increase, and is more preferable.

In contrast, an anaerobic biologically treated exhaust gas does not contain oxygen, but has a high concentration of carbon dioxide, high humidity, and a high water vapor content. Accordingly, even for the anaerobic biologically treated exhaust gas, blending with an oxygen-containing gas such as air allows the exhaust gas to be effectively used as a gas to be fed to the cathode chamber.

In view of the above, on sites which carry out biological power generation by using wastewater or organic waste as an energy source, a biological treatment facility which emits a biologically treated exhaust gas is preferably built close to the biological-power-generation facility, which is advantageous from an aspect of gas transportation.

The inventions according to the first to third embodiments and the sixth to eighth embodiments have been achieved on the basis of such findings.

BRIEF DESCRIPTION OF THE DRAWINGS

FIG. 2 shows a cross-sectional schematic view of a microbial power generator according to an embodiment of the present invention.

DETAILED DESCRIPTION OF EMBODIMENTS

Figure 1:
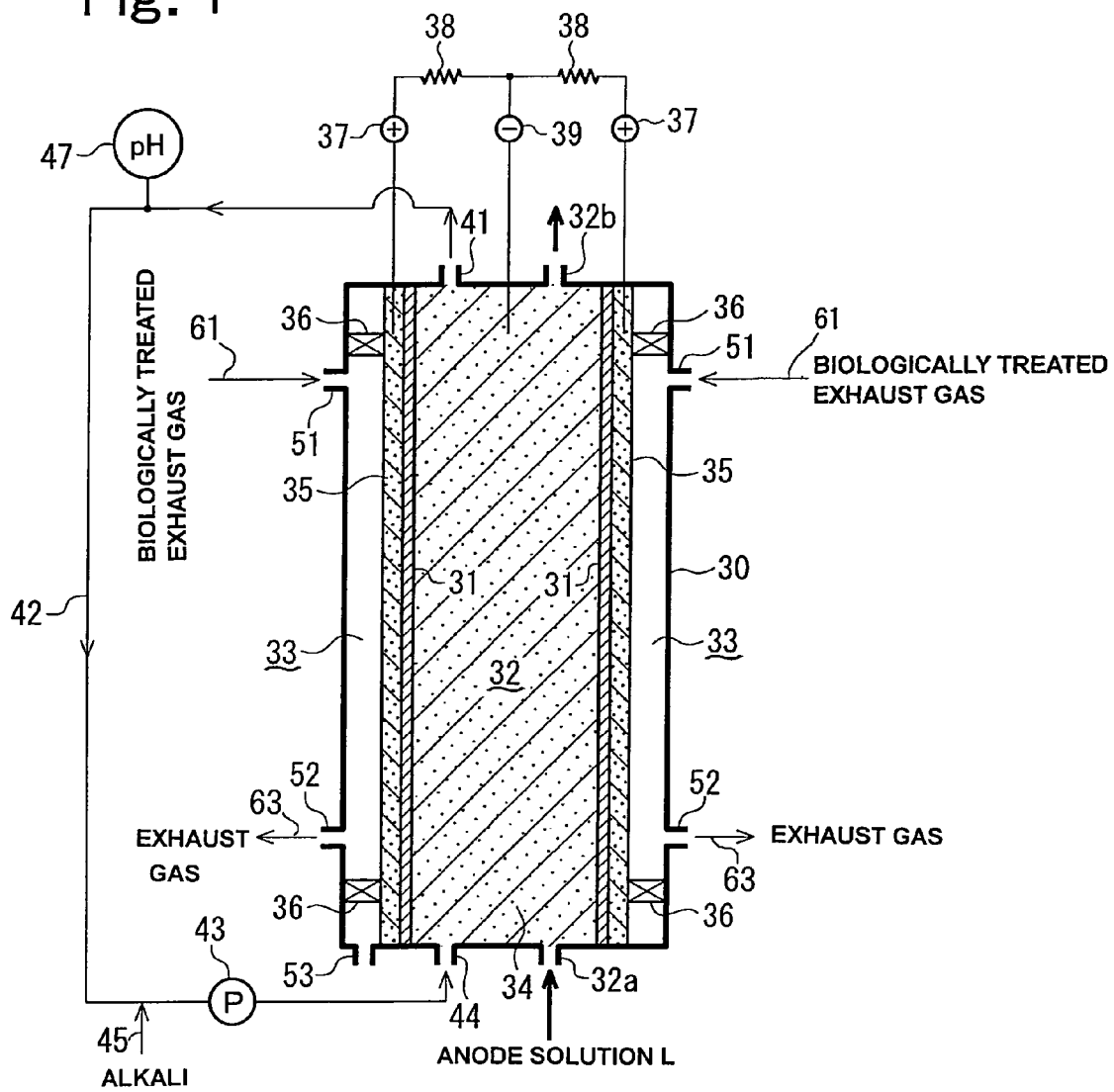
FIG. 1 shows a cross-sectional schematic view of a microbial power generator according to an embodiment of the present invention.

Hereinafter, by referring to the drawings, embodiments of the method for microbially generating electricity and the microbial power generator of the present invention are described in detail.

FIG. 2 shows a schematic cross-sectional view indicating a configuration outline of the method for microbially generating electricity and the power generator according to the present invention.

In a microbial power generator as shown in FIG. 2, the inside space of a tank 1 is compartmentalized into a cathode chamber 3 and an anode chamber 4 by an ion-permeable nonconductive membrane 2. In the cathode chamber 3, a cathode 5 is disposed so as to contact the ion-permeable nonconductive membrane 2.

In the anode chamber 4, an anode 6 made of a conductive porous material is disposed. The anode 6 directly contacts the ion-permeable nonconductive membrane 2 or contacts the membrane 2 via about one to two layers of microbial film. When the ion-permeable nonconductive membrane 2 is a cation-permeable'membrane, protons ($H^+$) can be transferred to the ion-permeable nonconductive membrane 2 from the anode 6.

The inside space of the cathode chamber 3 is vacant. An oxygen-containing gas (i.e., an aerobic biologically treated exhaust gas in the present embodiment) is introduced from a gas inlet 7 into the cathode chamber 3, and an exhaust gas flows out therefrom via a gas outlet 8 to pass through an ejection pipe 25.

As described below, a cation-permeable membrane is preferable for the ion-permeable nonconductive membrane 2 which separates the cathode chamber 3 from the anode chamber 4. However, other materials can be used.

Microorganisms are supported on the anode 6 made of a porous material. An anode solution L is fed into the anode chamber 4 from an inlet 4a. Waste fluid flows out from an outlet 4b. The inside of the anode chamber 4 is kept anaerobic.

The anode solution L in the anode chamber 4 is made to circulate through a circulation efflux port 9, a circulation pipe 10, a circulation pump 11, and a circulation return port 12. Partway along the circulation pipe 10, a pH meter 14 that determines the pH of a solution efflux from the anode chamber 4 is installed, and a pipe 13 used for adding an alkali such as aqueous sodium hydroxide is connected. Then, the alkali is added as needed so as to set the pH of the anode solution L to 7 to 9.

Condensed water generated in the cathode chamber 3 is drained from a condensed water outlet which is not shown in the Figure.

Electromotive force occurring between the cathode 5 and the anode 6 allows current to flow through an external resistor 21 via terminals 20 and 22.

An aerobic biologically treated exhaust gas containing oxygen, carbon dioxide, and water vapor is made to flow through the cathode chamber 3, and, by running a pump 11 to circulate the anode solution L as needed, a reaction:

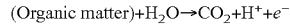
(Organic matter)+$H_2O \rightarrow CO_2 + H^+ + e^-$ proceeds in the anode chamber 4. This electron $e^-$ flows through the anode 6, the terminal 22, the external resistor 21, and the terminal 20 to the cathode 5.

The proton $H^+$ which has been generated in the above reaction moves to the cathode 5 by passing through a cation-permeable membrane of the ion-permeable nonconductive membrane 2. At the cathode 5, a reaction:

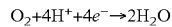
$O_2 + 4H^+ + 4e^- \rightarrow 2H_2O$ proceeds. $H_2O$ produced by this reaction at the cathode becomes condensed to yield condensed water. $K^+$ and $Na^+$, etc., which permeate through a cation-permeable membrane of the ion-permeable nonconductive membrane 2 are dissolved in this condensed water. For a conventional microbial power generator through which air passes as an oxygen-containing gas, the condensed water has a high alkaline pH from about 9.5 to 12.5 due to the above. However, in the present invention, since a biologically treated exhaust gas containing carbon dioxide passes through a generator, the neutralizing effect due to carbon dioxide allows the pH of this condensed water to be kept between about 7.5 and 9.

For example, when a cation-permeable membrane is used as the ion-permeable nonconductive membrane 2, electrons generated at the anode 6 flow from the terminal 22, the external resistor 21, and the terminal 20 to the cathode 5. In the meantime, protons as well as $Na^+$ and $K^+$ in the anode solution L which are introduced into the anode 6 permeate through the cation-permeable membrane of the ion-permeable nonconductive membrane 2 to be transported to the cathode chamber 3. In this case, a pH-neutralizing effect caused by inclusion of carbon dioxide in the gas which passes through the cathode chamber 3 is presumed to promote the transport of $Na^+$ and $K^+$. Because of this, an increase in the power generation efficiency can be achieved.

For the permeation of the proton $H^+$, $K^+$, and $Na^+$ through the ion-permeable nonconductive membrane 2, the transport of these ions can be promoted by increasing the ion permeability of the ion-permeable nonconductive membrane 5A because a sufficient amount of water vapor is fed into the cathode chamber 3. This leads to much further improvement in the power generation efficiency.

In the anode chamber 4, generation of $CO_2$ by a water-decomposing reaction by microorganisms tends to lower the pH. Then, an alkali is added to the anode solution L so as to keep the pH preferably between 7 and 9, the pH being detected by the pH meter 14. This alkali may be directly added to the anode chamber 6, but by adding the alkali to the circulating water, the whole region inside the anode chamber 6 can be maintained to have a pH between 7 and 9 without uneven distribution.

FIG. 1 shows a cross-sectional overview of a microbial power generator according to a particularly preferred embodiment of the present invention.

With respect to a microbial power generator as shown in FIG. 1, two plate-like ion-permeable nonconductive membranes 31 and 31 are disposed in parallel in a substantially rectangular tank 30. This arrangement allows an anode chamber 32 to be formed between the ion-permeable nonconductive membranes 31 and 31. Two cathode chambers 33 and 33 are separated from the anode chamber 32 by using the respective ion-permeable nonconductive membranes 31.

Inside the anode chamber 32, an anode 34 made of a porous material is disposed so as to directly contact the respective ion-permeable nonconductive membranes 31 or to contact them via about one to two layers formed of a biological membrane. It is preferable that the anode 34 is lightly pressed onto the ion-permeable nonconductive membranes 31 and 31 by applying a pressure of, for example, 0.1 kg/cm$^2$ or less.

In a cathode chamber 33, a cathode 35 is disposed so as to contact the ion-permeable nonconductive membrane 31. This cathode 35 is pressed onto the ion-permeable nonconductive membrane 31 by using packing 36. In order to enhance adhesion between the cathode 35 and the ion-permeable nonconductive membrane 31, both may be welded or bonded using adhesive.

A biologically treated exhaust gas as an oxygen-containing gas is introduced into the space between the cathode 35 and the tank 30, and flows therethrough.

The cathode 35 and the anode 34 are connected to an external resistor 38 via terminals 37 and 39, respectively.

An anode solution L is introduced into the anode chamber 32 from an inlet 32a, and waste fluid flows out from an outlet 32b. The inside of the anode chamber 32 is kept anaerobic.

The anode solution in the anode chamber 32 is made to circulate through a circulation efflux port 41, a circulation pipe 42, a circulation pump 43, and a circulation return port 44. An oxygen-containing gas from a pipe 61 flows in the respective cathode chambers 33 through a gas inlet 51, and an exhaust gas flows out from a gas outlet 52 to pass through a pipe 63. An aerobic biologically treated exhaust gas is used as an oxygen-containing gas in the present embodiment.

Partway along a circulation pipe 42 for the anode solution, a pH meter 47 is installed, and a pipe 45 used for adding an alkali is connected. The pH of the anode solution that flows out from the anode chamber 32 is detected by the pH meter 47. An alkali such as aqueous sodium hydroxide is added so as to produce a pH preferably between 7 and 9.

For a microbial power generator as shown in FIG. 1, an aerobic biologically treated exhaust gas containing oxygen, carbon dioxide, and water vapor is fed to the cathode chamber 33. The anode solution is made to pass through the anode chamber 32, or the anode solution is preferably made to circulate through the anode chamber 32. As a result, a potential difference occurs between the cathode 35 and the anode 34, and current flows through the external resistor 38.

The following is a detailed description of a microorganism and an anode solution for this microbial power generator, a biologically treated exhaust gas, an ion-permeable nonconductive membrane, preferable materials used for the anode and cathode, and the like.

A microorganism that produces electrical energy by being included in the anode solution L is not particularly limited as long as it functions as an electron donor. Examples can include bacteria, filamentous fungi, yeast, and the like which belong to each genus of *Saccharomyces, Hansenula, Candida, Micrococcus, Staphylococcus, Streptococcus, Leuconostoa, Lactobacillus, Corynebacterium, Arthrobacter, Bacillus, Clostridium, Neisseria, Escherichia, Enterobacter, Serratia, Achromobacter, Alcaligenes, Flavobacterium, Acetobacter, Moraxella, Nitrosomonas, Nitorobacter, Thiobacillus, Gluconobacter, Pseudomonas, Xanthomonas, Vibrio, Comamonas,* and *Proteus (Proteus vulgaris).* Activated sludge, as sludge containing the above microorganisms, as obtained from a biological treatment tank processing organic matter-containing water such as sewage, microorganisms which are included in water efflux from a primary sedimentation tank for sewage, and anaerobic digestive sludge, etc., are fed to the anode chamber as an inoculum. This allows the microorganisms to be retained at the anode. In order to enhance power generation efficiency, it is preferable to retain a high concentration of microorganisms in the anode chamber, and the microbial concentration is preferably, for example, between 1 and 50 g/L.

As the anode solution L, a solution which maintains microorganisms or cells and has compositions necessary for power generation is used. For example, when power generation utilizing a respiratory system is carried out, a medium having compositions such as nutrients and energy sources required for carrying out respiratory metabolism can be used, including a bouillon medium, M9 medium, L medium, a malt extract, MY medium, a nitrifying-bacteria-selection medium, and the like as a solution for the anode side. In addition, organic waste such as sewage, organic industrial drainage, and raw garbage can be used.

In the anode solution L, an electron mediator may be included so as to readily withdraw electrons from microorganisms or cells. Examples of the electron mediator can include, for example, compounds having a thionine skeleton such as thionine, dimethyl sulfonated thionine, new methylene blue, and toluidine blue-O; compounds having a 2-hydroxy-1,4-naphthoquinone skeleton such as 2-hydroxyl, 4-naphthoquinone; Brilliant Cresyl Blue, Gallocyanine, Resorufin, Alizarin Brilliant Blue, phenothiazinone, phenazine ethosulfate, safranin-O, dichlorophenolindophenol, ferrocene, benzoquinone, phthalocyanine, or benzyl viologen and derivatives thereof; and the like.

In order to further efficiently yield electric power, dissolution of materials which increase the power generation function of a microorganism such as an antioxidant like vitamin C, and a function-increasing material which only activates a specific electron transport system and substance transport system in a microorganism are preferable.

The anode solution L may include a phosphate buffer depending on need.

The anode solution L contains organic matter. This organic matter is not particularly limited if degraded by microorganisms. Examples of the organic matter that can be used include, for example, water-soluble organic matter, microparticles made of organic matter that are dispersed in water, and the like. The anode solution may be organic wastewater such as sewage and drain water from a food factory. The concentration of organic matter in the anode solution L is preferably a high concentration of between about 100 and 10,000 mg/L so as to enhance power generation efficiency.

A biologically treated exhaust gas which is made to pass through a cathode chamber may be, as described above, an aerobic biologically treated exhaust gas containing oxygen, carbon dioxide, and water vapor. Alternatively, it may be an anaerobic biologically treated exhaust gas containing carbon dioxide and water vapor. When the anaerobic biologically treated exhaust gas is used as a biologically treated exhaust gas, the biologically treated exhaust gas can be mixed with an oxygen-containing gas such as air in an appropriate ratio of, for example, the anaerobic biologically treated exhaust gas: air=1:0.5 to 500 (ratio by volume). Alternatively, instead of air, an aerobic biologically treated exhaust gas may be mixed.

The source of the biologically treated exhaust gas is not particularly limited. As well as an exhaust gas from an activated sludge method, any gas can be used as long as it has been exhausted during various biological treatments such as fixed bed, fluidized-bed, nitrification, denitrification, and compost, and it has a higher carbon dioxide concentration than air. In addition, two or more kinds of these biologically treated exhaust gases can be blended to be used.

As described above, an exhaust gas from an aeration tank which holds activated sludge and is being operated at neutral pH to weakly acidic pH is preferable, since the exhaust gas contains carbon dioxide at a high concentration. In addition, an exhaust gas from an aeration tank using an air diffuser having high oxygen-dissolution efficiency such as a microscopic-bubble-diffuser tube which has been recently widely used for the purpose of energy saving is also preferable because of a high concentration of carbon dioxide.

A composition of a biologically treated exhaust gas varies widely depending on where it is produced. However, an aerobic biologically treated exhaust gas usually has a composition where an $O_2$ concentration is between 15 and 19% by volume, a $CO_2$ concentration is between 1 and 5% by volume, and a humidity is between about 95 and 100%. An anaerobic biologically treated exhaust gas usually has a composition where a $CO_2$ concentration is between 20 and 40% by weight, and a humidity is between about 95 and 100%.

As described above, in one embodiment of the generating method by using the microbial power generator in which an oxygen-containing gas such as air is fed to the cathode chamber according to the present invention, carbon dioxide and water vapor can be added to the oxygen-containing gas. Such a method can be carried out by adding carbon dioxide into air as the oxygen-containing gas to have a flow ratio of air:carbon dioxide=100:about 0.1 to 20 and by injecting water vapor thereto. Water vapor can be added to the gas by, instead of injecting thereto, making the gas flow through a water tank to perform aeration. In this case, the gas becomes to contain water vapor under saturated vapor pressure at the temperature.

The exhaust gas from the cathode chamber may be subjected to deoxygenation treatment depending on need. Then, the exhaust gas is made to pass through the anode chamber, and can be used for purging dissolved oxygen from the anode solution L.

The ion-permeable nonconductive membrane may be an ion-permeable membrane such as a nonconductive ion-permeable cation-permeable membrane or anion-permeable membrane. Various ion-exchange membranes or reverse osmosis membranes, etc. can be employed. A cation-exchange membrane or anion-exchange membrane which has high proton selectivity is preferably used as an ion-exchange membrane. Examples of the cation-exchange membrane that can be used include, for example, Nafion® manufactured by Du Pont, Inc., CMB membrane which is a cation-exchange membrane manufactured by ASTOM Corporation, and the like. In addition, examples of the preferable anion-exchange membrane include an anion-exchange membrane manufactured by ASTOM Corporation, an anionic electrolyte membrane manufactured by TOKUYAMA Corporation, and the like. The ion-permeable nonconductive membrane is preferably thin and tough. Usually, the membrane thickness is preferably between 30 and 300 µm, and particularly preferably between 30 and 200 µm.

As the ion-permeable nonconductive membrane, a cation-exchange membrane is preferably used because the present invention effectively exerts an effect due to injection of carbon dioxide. In addition, with respect to the effect of increasing ion permeability by water vapor, an anion-exchange membrane is preferably used.

In order to retain a large number of microorganisms, the anode is preferably a porous body which has a large surface area, forms a large number of spaces, and possesses water permeability. Specifically, examples can include a sheet made of a conducting substance, the sheet being made rough at least on its surface, and a porous conductor in which a conducting substance is formed into a felt-like or other porous sheet (e.g., graphite felt, foamed titanium, foamed stainless).

Abutting such a porous anode to the ion-permeable nonconductive membrane directly or via microbial layers enables electrons generated during a microbial reaction to pass to the anode without using an electron mediator, and renders the electron mediator unnecessary.

A plurality of sheet-like conductors may be stacked to form an anode. In this case, the same type of conductor sheet can be stacked. Alternatively, different types of conductor sheets (e.g., graphite felt and a graphite sheet having a rough surface) can be stacked on one another.

The anode preferably has a total thickness from 3 mm or more to 40 mm or less, and particularly between about 5 and 20 mm. When stacked sheets constitute an anode, in order to pass liquid along with a paired surface (a lamination plane) between the sheets, the lamination plane is preferably oriented in a direction from an inlet to an outlet.

In the present invention, an anode chamber may be divided into a plurality of compartments. Serial connection of each compartment allows a decrease in the pH of each compartment to be reduced, and the pH of the liquid in the anode chamber may then be adjusted. Division of the anode chamber can decrease the amount of decomposition of organic matter in each compartment. As a result, the amount of production of carbon dioxide decreases, so that a decrease in the pH of each compartment can be lowered.

A cathode preferably has a conductive base material and an oxygen-reducing catalyst which is supported on the conductive base material.

For a conductive base material, any material can be used as long as it has a high conductivity, high corrosion resistance, sufficient conductivity and corrosion resistance in the case of a thin thickness, and mechanical strength as a conductive base material. Examples of the material that can be used include, but are not limited to, graphite paper, graphite felt, graphite cloth, stainless mesh, titanium mesh, and the like. Among them, from a viewpoint of durability and easy processing in particular, a graphite-based base material such as graphite paper, graphite felt, or graphite cloth is preferable, and graphite paper is particularly preferable. In addition, these graphite-based base materials may be those hydrophobized by a fluorine resin such as polytetrafluoroethylene (PTFE).

Regarding the thickness of the conductive base material of the cathode, a large thickness impairs oxygen permeability, and a small thickness fails to satisfy the required properties such as strength necessary for the base material. Thus, the thickness is preferably between about 20 and 3000 µm.

As an oxygen-reducing catalyst, as well as a noble metal such as platinum, a metal oxide such as manganese dioxide is suitable because they are inexpensive and have a better catalytic activity. The supported amount of catalyst is preferably set to about 0.01 to 2.0 mg/cm$^2$.

EXAMPLES

Hereinafter, the present invention is specifically illustrated by referring to Examples and Comparative Examples.

Comparative Example 1

In an anode chamber having a size of 7 cm (width)×25 cm (length)×2 cm (thickness), two sheets formed of a graphite felt having a thickness of 1 cm were stacked and installed to form an anode. A cathode chamber was formed beside this anode by interposing a cation-exchange membrane (manufactured by Du Pont, Inc.; product name is "Nafion 115"®) as an ion-permeable nonconductive membrane. The cathode chamber had a size of 7 cm×25 cm×0.5 cm (thickness). Next, a Pt catalyst manufactured by Tanaka Kikinzoku Kogyo K. K. (Pt-supporting carbon black; Pt content is 50% by weight) was dispersed in 5% by weight of a Nafion® solution (manufactured by Du Pont, Inc.). This solution was applied to carbon paper (manufactured by Toyo Carbon Co., Ltd.) having a thickness of 160 µm and being subjected to water-repellent treatment using PTFE to have a Pt-supporting amount of 0.4 mg/cm². Then, the carbon paper was dried at 50° C., and the resulting paper was tightly attached to the above cation-exchange membrane as a cathode.

A stainless wire was bonded using a conductive paste to the graphite felt of the anode and the carbon paper of the cathode, which formed an electric leading wire. Then, a 2-Ω resistor was connected partway along the wire.

An anode solution containing 1000 mg/L of acetic acid, phosphoric acid, and ammonia while keeping a pH of 7.5 was made to pass through the anode chamber. This anode solution had been heated beforehand to 35° C. in another water tank. The solution which had been heated at this water tank was made to pass through the anode chamber to have a flow rate of 10 mL/min. By this procedure, the anode chamber was heated to 35° C. It is notable that before the anode solution passed through the chamber, liquid efflux from another microbial power generator had been made to pass through the chamber as an inoculum.

A cathode chamber was aerated with dry air having ordinary temperatures to have a flow rate of 0.5 L/min.

As a result, in three days after the anode solution started passing through the chamber, the generation of electricity became almost constant, and the generation of electricity per 1 m³ of the anode was 140 W (i.e., power generation efficiency was 140 W/m³).

Comparative Example 2

Power generation was conducted in the same manner as Comparative Example 1 except that carbon dioxide was injected into the air to be fed to the cathode chamber from a carbon dioxide cylinder at a rate of 1 mL/min (0.2% to the air). Immediately after the injection of carbon dioxide, power generation efficiency began to increase. After 5 minutes, the power generation efficiency was 180 W/m³.

Example 1

Air to be fed to the cathode chamber was introduced into a closed 2-L water tank which had been filled with 1.5 L of pure water, and aeration was performed for 4 minutes. Then, the air was fed into the cathode chamber together with carbon dioxide. Except for the above, power generation was carried out in the same manner as Comparative Example 2. As a result, the power generation efficiency increased to 210 WW. It is notable that in this Example 1, the humidity of the air became 97% by performing aeration of a water tank with the air.

Example 2

Instead of air, an aerobic biologically treated exhaust gas ($O_2$ concentration: 19.8% by volume; $CO_2$ concentration: 1.3% by volume; humidity: 99%) was fed to the cathode chamber. The exhaust gas was produced by a fluidized-bed-type biological treatment tank having a volume of 40 m³ and BOD load of 0.5 kg/m³·day) in a wastewater treatment plant of a research institute. Except for the above, power generation was carried out in the same manner as Comparative Example 1. As a result, a power generation efficiency of 255 W/m³ was achieved.

Example 3

Instead of air, a mixed gas containing 200 mL/min of a biogas ($CO_2$ concentration: 32% by volume; humidity: 99%) and 400 mL/min of air was fed to the cathode chamber. The biogas was produced by a UASB apparatus (diameter: 10 cm; height: 60 cm; methanol synthetic substrate; load: 30 kg-$COD_{cr}$/m³/day). Except for the above, power generation was carried out in the same manner as Comparative Example 1. As a result, a power generation efficiency of 248 W/m³ was achieved.

The above results demonstrate that adding of carbon dioxide and water vapor to the oxygen-containing gas to be fed to the cathode chamber or use of a biologically treated exhaust gas as the oxygen-containing gas increases power generation efficiency.

The present invention has been described in detail by using specific embodiments. However, it is apparent to those skilled in the art that various modifications are allowed without departing from the spirit and scope of the present invention.

In addition, the present application claims benefit of Japanese Patent Application No. 2008-327988 filed on Dec. 24, 2008, which is herein incorporated by reference in its entirety.

REFERENCE NUMERALS

1, 30: Tank
2, 31: Ion-permeable nonconductive membrane
3, 33: Cathode chamber
4, 32: Anode chamber
5, 35: Cathode
6, 34: Anode

The invention claimed is:

1. A microbial power generator, comprising:
an anode chamber having an anode and retaining a solution containing a microorganism and an electron donor,
a cathode chamber having a cathode;
an ion-permeable nonconductive membrane contacting the cathode, the ion-permeable nonconductive membrane separating the cathode chamber from the anode chamber;
a gas inlet connected to the cathode chamber, feeding an oxygen-containing gas to the cathode chamber;
an $CO_2$/water vapor feeder feeding carbon dioxide and water vapor to the oxygen-containing gas to be fed to the cathode chamber;
a gas outlet having an ejection pipe, connected to the cathode chamber, discharging an exhaust gas from the cathode chamber through the ejection pipe,
wherein an inside space of the cathode chamber is vacant.

2. The microbial power generator according to claim 1, further comprising a water tank aerating the oxygen-containing gas so that the oxygen-containing gas contains the water vapor,
wherein the oxygen-containing gas with the water vapor and the carbon dioxide is fed to the cathode chamber.

3. A microbial power generator, comprising:
an anode chamber comprising an anode and retaining a solution containing a microorganism and an electron donor;
a first cathode chamber having a first cathode;
a first ion-permeable nonconductive membrane contacting the first cathode, and separating the first cathode chamber from the anode chamber;
a second cathode chamber having a second cathode;
a second ion-permeable nonconductive membrane contacting the second cathode, and separating the second cathode chamber from the anode chamber and facing the first ion-permeable nonconductive membrane;
a first gas inlet connected to the first cathode chamber, feeding an oxygen-containing gas to the first cathode chamber;

a second gas inlet connected to the second cathode chamber, feeding an oxygen-containing gas to the second cathode chamber;

a first $CO_2$/water vapor feeder feeding carbon dioxide and water vapor to the oxygen-containing gas to be fed to the first cathode chamber;

a second $CO_2$/water vapor feeder feeding carbon dioxide and water vapor to the oxygen-containing gas to be fed to the second cathode chamber;

a first gas outlet connected to the first cathode chamber, discharging an exhaust gas from the first cathode chamber;

a second gas outlet connected to the second cathode chamber, discharging an exhaust gas from the second cathode chamber;

an inlet connected to the anode chamber, introducing an anode solution to the anode chamber;

an outlet connected to the anode chamber, discharging a waste fluid from the anode chamber;

a circulating pipe connected to the anode chamber, circulating the anode solution therethrough;

a circulation efflux port connected to the anode chamber and the circulating pipe, discharging the anode solution to the circulating pipe; and a circulation return port connected to the anode chamber and the circulating pipe, introducing the anode solution circulated through the circulating pipe to the anode chamber.

4. The microbial power generator according to claim 3, further comprising a first pair of packing in the first cathode chamber, pressing the first cathode onto the first ion-permeable nonconductive membrane, a second pair of packing in the second cathode chamber, pressing the second cathode onto the second ion-permeable nonconductive membrane, and a plurality of terminals connecting the first cathode and the second cathode with the anode through an external resistor.

5. The microbial power generator according to claim 4, further comprising a pipe connected to the circulating pipe, adding an alkali to the anode solution in the circulating pipe, and a pH meter connected to the circulating pipe, metering pH of the anode solution in the circulating pipe.

6. The microbial power generator according to claim 3, wherein an inside space of the cathode chamber is vacant.

* * * * *